Figure 1:
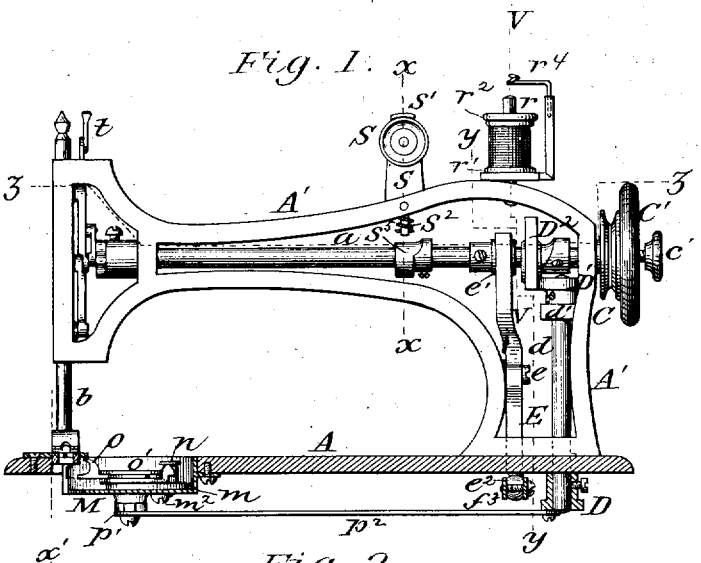

N. MEYERS,

Assignor by mesne assignments to J. M. FAIR.

SEWING MACHINE.

No. 10,234. Reissued Nov. 7, 1882.

Witnesses:
Alex. Scott
Will R. Ormsbundt

Inventor:
Nicholas Meyers
By Atty
J. McIntire

N. MEYERS,

Assignor by mesne assignments to J. M. FAIR.

SEWING MACHINE.

No. 10,234. Reissued Nov. 7, 1882.

Witnesses:

Alex. Scott

Will R. Anshutz

Inventor:

Nicholas Meyers

By att.

J. Mac Intire

N. MEYERS,

Assignor by mesne assignments to J. M. FAIR.

SEWING MACHINE.

No. 10,234. Reissued Nov. 7, 1882.

Witnesses:
Alex. Scott
Will C. Omohundro

Inventor:
Nicholas Meyers
per atty
J. Mac Dillon

UNITED STATES PATENT OFFICE.

NICHOLAS MEYERS, OF BUFFALO, NEW YORK, ASSIGNOR, BY MESNE ASSIGNMENTS, TO JOHN M. FAIR, OF SAME PLACE.

SEWING-MACHINE.

SPECIFICATION forming part of Reissued Letters Patent No. 10,234, dated November 7, 1882.

Original No. 237,990, dated February 22, 1881. Application for reissue filed August 23, 1882.

DIVISION A.

*To all whom it may concern:*

Be it known that I, NICHOLAS MEYERS, of the city of Buffalo, in the county of Erie and State of New York, have invented certain new and useful Improvements in Sewing-Machines, of which the following is a full, clear, and exact description, reference being had to the accompanying drawings, forming part of this specification.

This invention relates to that kind of sewing-machine which is adapted to be used in either of two ways to produce either a lock-stitch or a single chain-stitch, these two being the kinds of stitches mostly used, and it being very desirable (for reasons well known to those skilled in the art) to have a sewing-machine possess the capacity to do either of the kinds of work alluded to, provided it be efficient for each kind, and its capacity to do either kind at pleasure does not render the machine either too complex and expensive or liable to get out of order, or difficult or inconvenient of variation to set it for doing one and the other kind of work.

To afford for use a machine which, while it shall possess the capacity to make either a lock-stitch or a single chain-stitch, shall also be capable of a conversion from one to another condition to adapt it to either of these two kinds of work in a most convenient manner, and shall also be simple and efficient, and not liable to get out of order, is the main object of this invention, which, to this main end and object, consists in a machine constructed upon substantially the principle and operating substantially in the manner hereinafter more fully described, and as will be more specially pointed out in the claims of this specification, whereby the machine is rendered capable, not only of efficiently doing either one of the two kinds of work already alluded to, but of also being converted from a lock-stitch into a chain-stitch machine, and vice versa, by a mere adjustment of a mechanism which is adapted to drive both a shuttle and a hook, but at different times.

To enable those skilled in the art to make and use a machine constructed according to my invention, I will now proceed to more fully explain the latter, referring by reference-letters to the accompanying drawings, in which—

Figure 4:
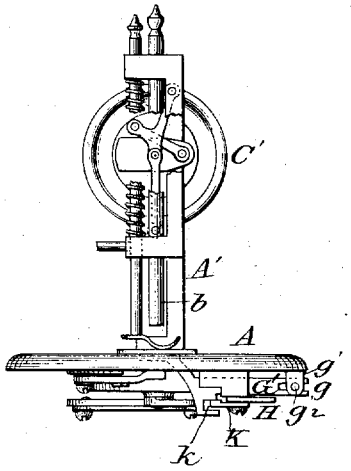
Figure 2:
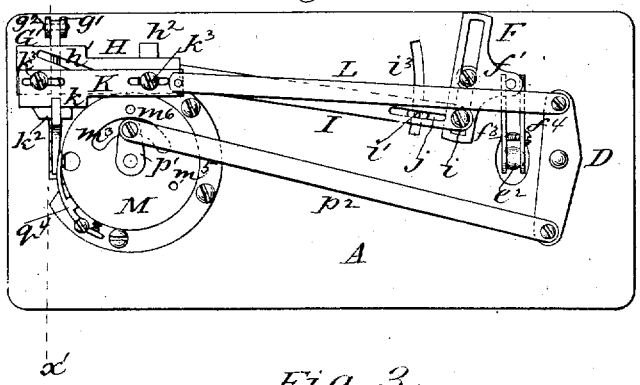
Figure 5:
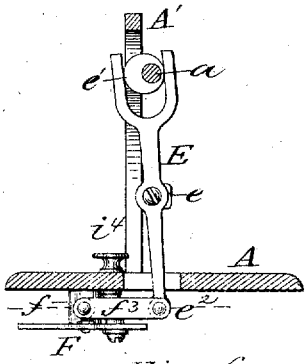
Figure 3:
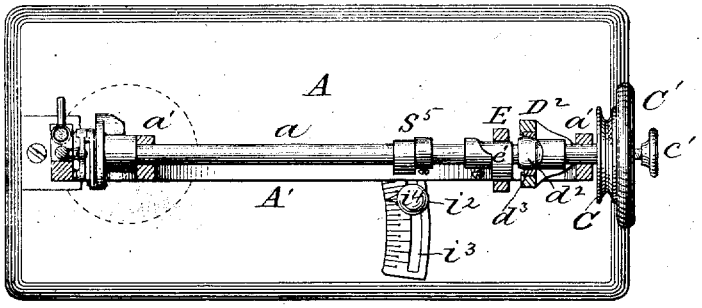
Figure 6:
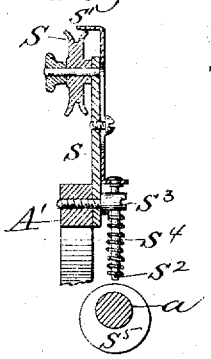
Figure 7:
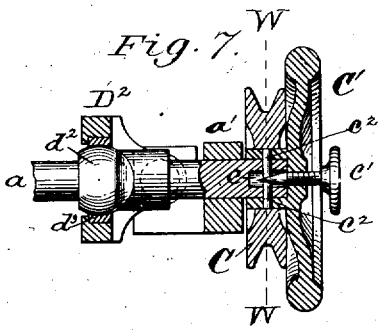
Figure 12:
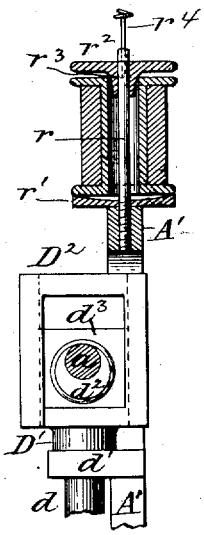
Figures 8, 9, 10:
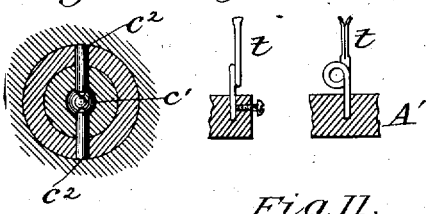
Figure 13:
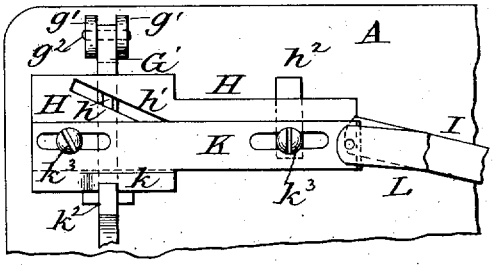
Figure 11:
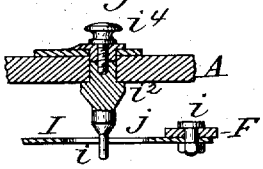
Figure 14:
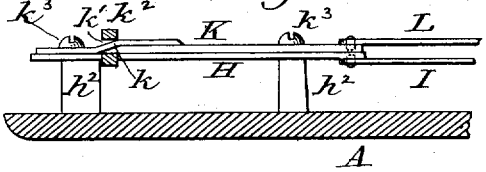
Figure 16:
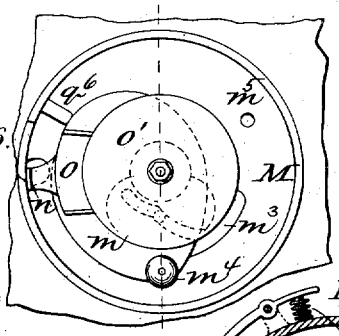
Figure 15:
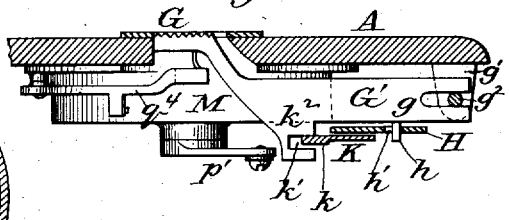
Figure 18:
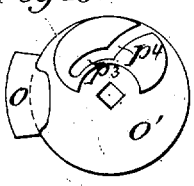
Figure 17:
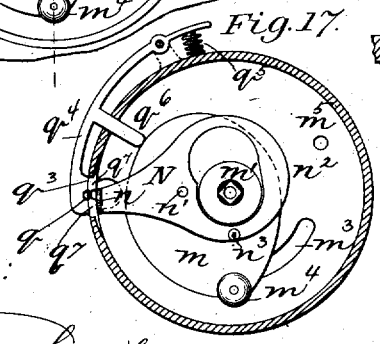
Figure 19:
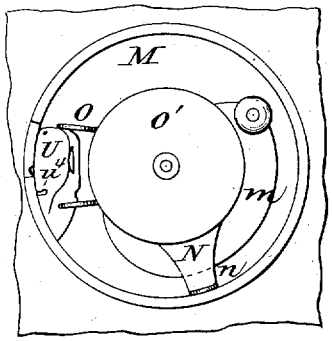
Figure 21:
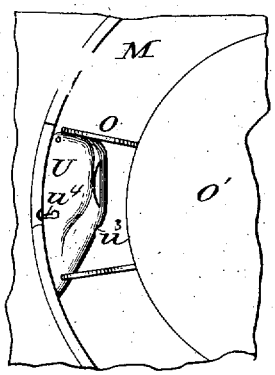
Figure 22:
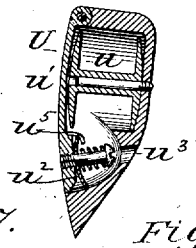
Figure 23:
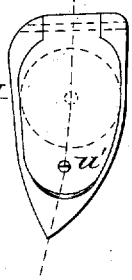
Figure 24:
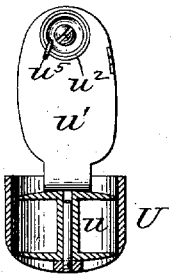
Figure 27:
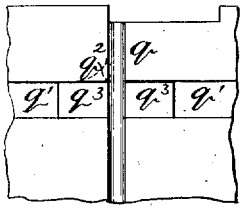
Figure 28:
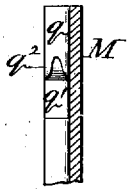
Figure 25:
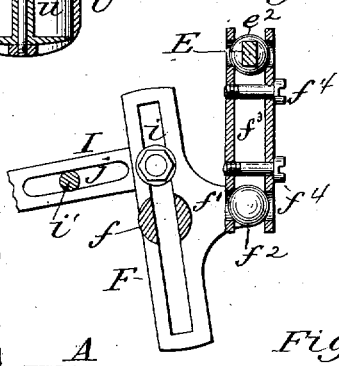
Figure 20:
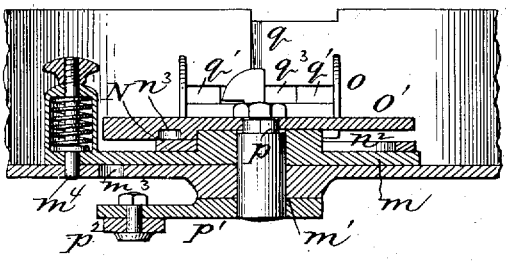
Figure 26:
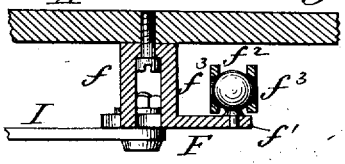

Figure 1 is a partly-sectional side elevation of a sewing-machine made according to my invention. Fig. 2 is a bottom plan view thereof. Fig. 3 is a horizontal section in line $z$ $z$, Fig. 1. Fig. 4 is a front elevation of the machine. Fig. 5 is a vertical section in line $y$ $y$, Fig. 1, showing the mechanism by which motion is imparted to the feed mechanism. Fig. 6 is a vertical section in line $x$ $x$, Fig. 1, showing the device for holding and releasing the tension-wheel. Fig. 7 is a horizontal section on an enlarged scale, showing the spherical connection by which the vertical shaft is actuated, and the device for tightening and releasing the loose pulley. Fig. 8 is a section in line W W, Fig. 7. Fig. 9 is a side view, and Fig. 10 a face view, of the auxiliary tension device. Fig. 11 is a vertical section of the feed-reversing link and connecting parts. Fig. 12 is a vertical section in line V V, Fig. 1. Fig. 13 is a bottom plan view, and Fig. 14 an inverted side elevation, of the front portion of the feed mechanism. Fig. 15 is a cross-section in the line $x'$ $x'$, Fig. 2. Fig. 16 is a top plan view of the hook and shuttle mechanism, showing the hook in operative position. Fig. 17 is a similar view, with the shuttle-carrier removed. Fig. 18 is a bottom plan view of the shuttle-carrier. Fig. 19 is a top plan view showing the shuttle-carrier in operative position. Fig. 20 is a fragmentary sectional elevation of the hook and shuttle mechanism. Fig. 21 is a top plan view of the shuttle and a portion of its race and carrier. Fig. 22 is a horizontal section of the shuttle. Fig. 23 is a side view of the same. Fig. 24 is a cross-section of the shuttle, showing the hinged cover raised. Fig. 25 is a top plan view of the feed-regulating link and connecting parts. Fig. 26 is a vertical section of the same. Fig. 27 is an inside elevation of a portion of the shuttle-race. Fig. 28 is a cross-section thereof through the needle-groove.

Like letters of reference designate similar parts in the several figures.

A represents the bed-plate of the machine, and A′ the overhanging arm, secured thereto or cast in one piece therewith.

$a$ is the horizontal shaft which transmits motion to the needle-bar $b$ and other parts of the machine, and which is supported in bearings $a'$ in the arm A′.

C is the grooved pulley, which is mounted loosely on the rear end of the horizontal shaft $a$ for receiving motion from the pulley of the treadle mechanism. The pulley C, as shown in Fig. 7, is mounted loosely on the hub of the balance-wheel C′, which latter is secured to the end of the shaft $a$. The end of the shaft $a$ is provided with an axial cavity, $c$; and $c'$ is a set-screw working in a threaded axial bore of the balance-wheel C′, and projecting with its conical end into the cavity $c$ of the shaft.

$c^2$ represents two sliding bolts, arranged radially to the cavity $c$, so as to rest with their inner conical ends against the conical end of the set-screw $c'$, while their outer ends bear against the loose pulley C. By turning in the set-screw $c'$ the sliding bolts $c^2$ are forced outward against the loose pulley C, and the latter is thereby prevented from turning on the hub of the balance-wheel C′, and enabled to transmit its rotary motion to the shaft $a$, while, by screwing the set-screw $c'$ out, the bolts $c^2$ are released also, and the pulley C is permitted to turn freely without rotating the shaft $a$. The pulley C is in this manner readily loosened when it is desired to wind the bobbin, or tightened when the machine is used for sewing.

$d$ is the vertical shaft which transmits motion to the hook and shuttle mechanism and to the mechanism which gives the feed mechanism its vertical movement. The upper end of the shaft $d$ is supported in a bearing, $d'$, formed with the arm A′, and its lower end projects through the bed-plate A, and carries on the under side thereof a two-armed lever, D.

$d^2$ is an eccentric, secured to the horizontal shaft $a$, for imparting a rocking motion to the vertical shaft $d$. The face of the eccentric $d^2$ is made spherical in form, and engages in a box, $d^3$, having its inner side shaped to correspond with the spherical face of the eccentric, and having its straight sides arranged in an open frame, D², so as to slide vertically therein. The frame D² is attached to the end of a horizontal rock-lever, D′, secured to the upper end of the shaft $d$. The rotary movement of the eccentric $d^2$ imparts a rocking motion to the arm D′ and shaft $d$ in an obvious manner.

E is the rock-lever which imparts motion to the feed mechanism. It is pivoted at $e$ to the arm A′, and straddles with its upper bifurcated end an eccentric, $e'$, mounted on the shaft $a$. The lower end of the rock-lever E projects through an opening in the bed-plate A and terminates in a spherical knuckle, $e^2$.

F is the link which regulates the direction and length of the feed-movement. It is pivoted at its center to the under side of the bed-plate A by means of a U-shaped hub, $f$, as clearly shown in Fig. 26.

$f'$ is an arm, formed centrally on the link F, and provided on its upper side with a spherical knuckle, $f^2$, arranged in line with the spherical knuckle $e^2$ of the rock-lever E.

$f^3$ is connecting-rod, composed of two straps arranged on opposite sides of the knuckles $e^2$ $f^2$, and provided with spherical eyes. The two parts of the connecting-rod are secured together by clamping-bolts $f^4$, and the knuckles $e^2$ $f^2$ are in this manner firmly connected, and at the same time the necessary lateral and vertical play is given to these parts.

G represents the serrated feed-plate, provided on the under side of the bed-plate A with a horizontal arm, G′, the outer end of which is provided with a horizontal slot, $g$, as clearly shown in Fig. 15.

$g'$ represents two lugs, which depend from the under side of the bed-plate A, and between which the slotted end of the arm G′ plays.

$g^2$ is a horizontal pin, secured to the lugs $g'$, and passing through the slot $g$, so as to hold the arm G′ in a horizontal position.

$h$ is a pin depending from the arm G′, and engaging in an inclined slot, $h'$, formed in the sliding plate H in such manner that the longitudinal-reciprocating motion of the plate H will produce a transverse-reciprocating motion to the feed-plate and arm G G′. The plate H bears against two depending lugs, $h^2$, formed with the bed-plate A.

I is a rod connecting the sliding-plate H with the link F, which latter is provided with a slide, $i$, to which the end of the connecting-rod I is attached, so that the same can be placed in any desired position on either side of the center of the link. The rod I is provided near the link with a longitudinal slot, $j$, in which engages a pin, $i'$, which projects downward from the under side of a slide, $i^2$, arranged in a curved slot, $i^3$, formed in the bed-plate A. By moving the slide $i^2$ in the slot $i^3$ the position of the rod I is changed with reference to the center of the link, thereby increasing or decreasing the length of the feed-motion, and changing the length of the stitch accordingly, or reversing the feed-motion if so desired. The rod I is held in position in the link by a set-screw, $i^4$, entering the slide $i^2$, and bearing against the upper side of the bed-plate A. The slot $i^3$ may be provided on the upper side of the bed-plate with a graduated index for facilitating the adjustment of the slide $i^2$ and rod I.

K represents a longitudinally-reciprocating bar or plate, arranged on the under side of the plate H. The plate K is provided on one side with an incline, $k$, which engages in a slot, $k'$, formed in a depending lug, $k^2$, of the arm G′. The longitudinal movement of the plate K produces, by means of its incline $k$, an up-and-down motion in the arm G′ and the feed-plate G, attached thereto, in an obvious manner. The plates K and H are held to the lugs $h^2$ of the plate by screws $k^3$, passing through slots in the plates, which permit the requisite longitudinal movement of the plates. The plate K is actuated by the connecting-rod L from the short arm of the lever D.

M represents the shuttle-race, of circular form, secured in an opening of the bed-plate A by screws passing through a flange which is formed on the upper edge of the shuttle-race and bears against the lower side of the bed-plate.

$m$ is the adjustable supporting-plate of the hook and shuttle mechanism, arranged upon the bottom of the shuttle-race so as to swing on the central hub, $m'$, of the shuttle-race. The plate $m$ is held down upon the bottom of the shuttle-race by a screw, $m^2$, entering the plate $m$ from below and passing through a curved slot, $m^3$, in the bottom of the shuttle-race. The slot $m^3$ is made of sufficient length to permit the proper adjustment of the supporting-plate $m$. The adjustable supporting-plate $m$ is provided with a spring-bolt, $m^4$, which can be made to engage in either of two openings, $m^5$ $m^6$, formed in the bottom of the shuttle-race, thereby holding the plate $m$ in either of two positions, in one of which the shuttle is rendered operative, and in the other of which the hook is used.

$n$ is the loop-detaining hook employed in sewing the chain-stitch. It is formed at the end of a plate, N, which is pivoted to the adjustable plate $m$ at $n'$, between the hub $m'$ and the hook $n$. The plate N is provided with a loop-shaped extension, $n^2$, surrounding the hub $m'$, and carries at one side a short upwardly-projecting pin, $n^3$.

O is the shuttle-carrier, and O′ the plate to which it is secured. The plate O′ is attached to a short upright shaft, $p$, passing through the hub $m'$ of the shuttle-race, and provided at its lower end with a rock-arm, $p'$, which is actuated from the long arm of the lever D by a connecting-rod, $p^2$, whereby the proper oscillatory movement is imparted to the shuttle-carrier. The shuttle-plate O′ is provided on its under side with a groove composed of an inner concentric portion, $p^3$, and an outer eccentric portion, $p^4$, extending from the end of the concentric portion $p^3$ to the periphery of the shuttle-plate. The groove $p^3$ $p^4$ is made of such width as to receive and actuate the pin $n^3$ of the hook-plate N. Upon locking the plate $m$ in the position shown in Fig. 19, in which the spring-bolt $m^4$ enters the opening $m^5$, the shuttle-carrier is operated by the central shaft, $p$, without imparting any motion to the hook-plate N, as the pin $n^3$ of the latter is in this position of the plate $m$ entirely withdrawn from the groove $p^3$ $p^4$. In this position of the parts the machine is properly adjusted for sewing the lock-stitch. Upon releasing the bolt $m^4$ and turning the supporting-plate $m$ until the bolt $m^4$ enters the opening $m^6$, as shown in Fig. 16, the groove $p^3$ $p^4$ grasps the pin $n^3$ on the hook-plate N. In this position of the parts the oscillatory movement of the shuttle-plate $m$ is partly transmitted to the hook-plate N by the groove $p^3$ $p^4$ and pin $n^3$. The concentric portion $p^3$ of the groove permits the shuttle-plate $m$ to swing without imparting motion to the hook-plate N, only the portion $p^4$ of the groove being effective in oscillating the hook-plate N. By this means the stroke or extent of movement which the shuttle-plate imparts to the hook-plate is shortened to that which is proper for the hook-plate. The parts when in the position just described, and as illustrated in Figs. 16 and 17, are in the proper position for sewing the chain-stitch.

$q$ is the vertical needle-chamber formed in the side of the shuttle-race, and $q'$ is a horizontal recess intersecting the needle-chamber $q$ at right angles. The recess $q'$ is made concentric with the fulcrum of the hook-plate N, to permit the free movement of the hook through the recess. The back of the needle-chamber extends downward through the horizontal recess $q'$, and the latter is provided on both sides of the needle-chamber with openings $q^7$ extending through the wall of the shuttle-race. The upper corner, at the intersection of the needle-chamber with the recess $q'$, toward which the hook moves in opening the loop, is provided with an undercut lip or depending tongue, $q^2$, as shown in Figs. 27 and 28. This tongue seizes the thread as the hook passes by, and the loop is thereby opened and held so until the needle has passed through the loop in its descent.

$q^3$ is a grooved block, which fills the openings $q^7$ in the recess $q'$ when the hook is not used, so as to form a smooth surface for the shuttle to work against. The block $q^3$ is attached to the end of a lever, $q^4$, arranged outside of the shuttle-race.

$q^5$ is a spring bearing against the short arm of the lever $q^4$, whereby the block $q^3$ is held in the opening of the recess $q'$.

$q^6$ is an arm formed at the inner side of the lever $q^4$ and projecting into the shuttle-race through an opening in the side thereof. The arm $q^6$ bears against the adjustable supporting-plate $m$, which latter is made eccentric, or of such form that the block $q^3$ will be permitted to project into the openings when the plate $m$ is in the position in which the shuttle is used. Upon turning the plate $m$ toward the opening $m^6$, for bringing the hook mechanism in operation, the plate $m$ forces the arm $q^6$ outward and holds the lever $q^4$ and block $q^3$ away from the openings in the recess $q'$, as shown in Fig. 17.

$r$ is the spool-post, rigidly secured to the arm A′; and $r'$ is the supporting disk, preferably made concave on its upper side, and secured to the lower end of the post $r$.

$r^2$ is the clamping-disk, which fits snugly on the post $r$, and is preferably provided on its under side with a conical extension, $r^3$, which enters the bore of the spool.

$r^4$ is a thread-guide, pivoted to an upright arm which rises from the lower disk, $r'$, so that the eye of the guide $r^4$ can be arranged centrally over the spool-post $r$. The spool is placed upon the post $r$, and the upper disk, $r^2$, is pressed down upon the spool to prevent the latter from turning. The end of the thread is then drawn through the eye of the guide $r^4$, and the thread is unwound from the spool in a steady and regular manner without rotating the spool, thereby avoiding the irregular movement which occurs in unwinding the thread from a rotating spool.

S is the tension-wheel, turning on an arbor projecting laterally from the post $s$, which is secured to the arm A′.

$s'$ is a brake which bears against the periphery of the wheel S, for arresting the movement of the wheel when required. As shown in the drawings, the brake $s'$ consists of a sliding bar or plate arranged on the rear side of the post $s$, to which it is attached by a screw passing through a vertical slot in the brake-plate. The upper end of the latter is bent, so as to overlap the wheel S. The lower end of the brake-plate terminates in a pin or rod, $s^2$, which passes through an opening in a horizontal arm, $s^3$, and is provided on the under side of the latter with a spring, $s^4$, which tends to hold the brake down against the wheel S.

$s^5$ is an eccentric, mounted on the shaft $a$ and engaging with the lower end of the pin $s^2$, so as to raise the brake and release the tension-wheel when required. The eccentric $s^5$ is so arranged on the shaft as to hold the tension-wheel during a certain portion of the descending movement of the needle-bar.

$t$ is an auxiliary thread-controlling device, secured to the arm A′ immediately in the rear of the needle-bar, and consisting of two upwardly-diverging elastic blades, which are secured to a common stem. The blades are made of such height that their distended upper ends will clamp and hold the thread during the last portion of the downward movement of the needle-bar, while the thread will be lifted out from between the blades and run off unrestricted during a portion of the upward movement of the needle-bar. The stem to which the blades are attached is preferably coiled, so as to form an ordinary eye or thread-guide, through which the thread is passed when sewing the lock-stitch, while the thread is clamped between the blades when sewing the chain-stitch. The thread-controlling device is made vertically adjustable by means of a set-screw, in order to regulate its height in accordance with the thickness of the fabric operated upon.

U represents the body of the shuttle, made of the proper form and curvature to fit in the shuttle-carrier O and the race M. The body of the shuttle is made sufficiently large to receive a bobbin or ball of thread, $u$. The side of the shuttle which lies against the race is provided with a hinged lid or cover, $u'$, to which is attached a tension device, $u^2$. The latter consists of a tension-disk held against a boss on the inner side of the hinged lid by means of a spring and set-screw. The back of the shuttle is provided with an opening, $u^3$, through which a screw-driver can be introduced for turning the set-screw and regulating the tension. The thread passes from the bobbin around the tension device and then out through an opening, $u^4$, in the upper side of the shuttle. The shuttle is threaded by simply passing the thread under the hook $u^5$ of the tension device, then between the tension-plates, and out through the top opening, when, by simply closing the hinged lid, the shuttle is ready for operation.

Having now so fully explained the construction and operation of a machine made according to my invention that those skilled in the art to which my said invention relates can make and use the same, what I claim as new, and desire to secure by Letters Patent, is—

1. In combination with the shuttle-carrier and means for driving it, a hook adapted to operate in conjunction with and at the same side of the needle with which the shuttle of said carrier is adapted to co-operate, and means for adjusting the said carrier and hook relatively, so that either may be made to move in the working-path of motion of the other, as set forth.

2. In combination with the shuttle-carrier, the needle, and a hook mechanism adapted to work at the same side of the needle that the shuttle does, a needle-block which may be varied, substantially as set forth, so as to co-operate either with the needle and shuttle or with the needle and hook.

3. The combination, with the circular shuttle-race M, the central rock-shaft, $p$, and suitable mechanism for actuating said shaft, of the adjustable supporting-plate $m$, plate N, provided with hook $n$, plate O′, provided with shuttle-carrier O, and devices whereby the plates $m$, N, and O′ are connected together, substantially as set forth.

4. The combination, with the shuttle-plate O′, provided with groove $p^3$ $p^4$, and mechanism whereby an oscillating movement is imparted to the said plate O′, of the hook-plate N, provided with pin $n^3$, substantially as set forth.

5. The combination, with the shuttle-race M, provided with a stationary needle-chamber, $q$, and openings $q^7$ on both sides thereof, of the movable block $q^3$ and mechanism for adjusting the same, whereby the openings $q^7$ can be closed when the shuttle is used and opened when the hook is used, substantially as set forth.

6. The combination, with the shuttle-race M, provided with openings $q^7$ and the recess $q'$, of the block $q^3$, lever $q^4$, having arm $q^6$, spring $q^5$, and eccentric plate $m$, substantially as set forth.

In witness whereof I have hereunto set my hand this 19th day of July, 1882.

NICHOLAS MEYERS.

In presence of—

JNO. J. BONNER,
CHAS. F. GEYER.